(12) United States Patent
Lijachev et al.

(10) Patent No.: US 10,678,798 B2
(45) Date of Patent: Jun. 9, 2020

(54) METHOD AND SYSTEM FOR SCORING CREDIBILITY OF INFORMATION SOURCES

(71) Applicant: Outside Intelligence Inc., Toronto (CA)

(72) Inventors: Victor Fernandovich Comas Lijachev, Toronto (CA); Daniel Ryan Adamson, Toronto (CA)

(73) Assignee: EXIGER CANADA, INC., Ottawa, Ontario (CA)

( * ) Notice: Subject to any disclaimer, the term of this patent is extended or adjusted under 35 U.S.C. 154(b) by 388 days.

(21) Appl. No.: 15/629,355

(22) Filed: Jun. 21, 2017

(65) Prior Publication Data

US 2017/0286431 A1    Oct. 5, 2017

Related U.S. Application Data

(63) Continuation of application No. 15/237,163, filed on Aug. 15, 2016, now abandoned, which is a continuation of application No. 13/939,755, filed on Jul. 11, 2013, now abandoned.

(51) Int. Cl.
 *G06F 17/00* (2019.01)
 *G06F 16/2457* (2019.01)
 *G06F 16/95* (2019.01)

(52) U.S. Cl.
 CPC ........ *G06F 16/24578* (2019.01); *G06F 16/95* (2019.01)

(58) Field of Classification Search
 CPC .............................. G06F 16/313; G06F 16/35
 See application file for complete search history.

(56) References Cited

U.S. PATENT DOCUMENTS

| | | | |
|---|---|---|---|
| 6,981,040 B1 * | 12/2005 | Konig | H04L 67/20 |
| 8,117,223 B2 * | 2/2012 | Patterson | G06F 16/313 |
| | | | 707/759 |
| 8,560,550 B2 * | 10/2013 | Patterson | G06F 16/93 |
| | | | 707/741 |
| 2007/0239701 A1 | 10/2007 | Blackman et al. | |
| 2008/0228675 A1 | 9/2008 | Duffy et al. | |
| 2009/0012946 A1 * | 1/2009 | Tsunokawa | H04N 7/173 |
| 2009/0077069 A1 * | 3/2009 | Polanyi | G06F 16/319 |
| 2013/0325877 A1 * | 12/2013 | Niazi | G06Q 30/0203 |
| | | | 707/748 |

* cited by examiner

*Primary Examiner* — Hung Q Pham
(74) *Attorney, Agent, or Firm* — Polsinelli PC; Eric J. Hanson (57) ABSTRACT

A method for classifying information sources and content based on credibility, reliability, or trust. A content item describing an event is retrieved from an information provider and parsed for links. Each link is evaluated and attributed a sentiment score. The same event is identified in a set of know sources and an event score is calculated based on the credibility of each of the known sources. Finally, the content item is ranked based on the event and sentiment scores.

8 Claims, 5 Drawing Sheets

METHOD AND SYSTEM FOR SCORING CREDIBILITY OF INFORMATION SOURCES

FIELD OF THE INVENTION

The present invention relates generally to information extraction. More particularly, the present invention relates to classifying or ranking information sources and events during extraction.

BACKGROUND OF THE INVENTION

The internet is one of the primary sources of information of modern life. However, on the web, there coexists a lot of valuable, useful and accurate information together with misleading or inaccurate information. There also exists sources of information that are more trusted and those that are less trusted, and other sources which cannot readily be identified as trusted or not trusted. General web-based searching can return information that is harmful or misleading. The use of non-credible sources of information as basis for decisions can have a severe impact in fields like politics, health, finance and many others. For instance, in the 2008 U.S. presidential campaign of Barack Obama, misleading information connecting the future president to a Muslim faith organization resulted in substantial confusion among voters. Various other instances of false or misleading reports emanating from the internet have been document, and have had consequences affecting lives and decisions. In more daily and personal applications, information obtained from the internet serves as a basis for decision making in insurance underwriting processes, credit and lending decisions, merger and acquisitions, fraud detection, hiring decisions and many others. In this sense, credibility assessments are becoming of increasing importance in order to build judgment skills to properly discern between different sources of information, and to address contradictions in information from various sources.

Prior art approaches to this problem have attempted to reduce web spam by developing credibility based link analysis algorithms like the ones used in common search engines. Common examples include the PageRank algorithm developed and used by Google™, the TrustRank algorithm developed by Stanford University and Yahoo!™, and the HITS algorithm which was a precursor to the PageRank algorithm. Each of these prior art approaches rely on the assumption that the quality of a web page is correlated to the quality of its links, and return, in response to a search query, a ranked list of web pages as a result of a search. Spammers have created several ways to take advantage of how search engines operate like "hijacking" trusted web pages and building "honeypots" or groups of legitimate-appearing web pages to induce trusted pages to link them. Recent studies (such as (i) D. Fetterly, M. Manasse, and M. Najork. Spam, damn spam, and statistics. WebDB, 2004 and (ii) Z. Gyöngyi, H. Garcia-Molina, and J. Pedersen. Combating Web spam with TrustRank. VLDB, 2004.) suggest 26% of web content is spam. On top of this, there is some amount of inaccurate or mistrusted information that cannot be properly described as spam.

As is evident, prior art approaches have been suitable for ranking web pages and providing a list of hits in response to a search request, but are inadequate for assessing the reliability of the information, the reliability of the links to other sources on web pages, or the reliability of events being described with sufficient confidence to permit decision-makers to rely on this information without a significant due diligence burden.

SUMMARY OF THE INVENTION

In contrast to prior art approaches, the present invention does not attempt to determine if a source is spam, but rather, attempts to assess the underlying credibility of sources and the probability that information from the underlying source, such as an event or a purported fact has occurred, is truthful or reliable. Events or facts may be derived from more than one source, and it is the events or facts themselves that are assessed for their reliability, rather than the web pages themselves.

According to one embodiment of the invention, there is provided a computer-implemented method for ranking information stored on a computer readable medium; the method includes extracting a content item describing an event from an information source; parsing by a parsing module the content item for a plurality of source links; attributing by a content analysis module a sentiment score to each source link; wherein the sentiment score is indicative of the relative credibility of each of the source links; scoring by a scoring module the information source based on the source links and on the sentiment score ranking the content item based on a score associated with the information source.

According to one aspect of this embodiment, the scoring comprises calculating r from equation (1):

$$r = \alpha * T + (1-\alpha) * d \quad (1)$$

where d is a non-zero static score distribution vector, T is a transition matrix, and α is a predetermined constant; and, wherein each term in the transition matrix is modified by a non-zero sentiment score.

According to another aspect of this embodiment, the method further includes storing on a score database implemented on a computer readable medium the score for the information source.

According to another aspect of this embodiment, the method further includes prior to the parsing step determining whether the information source has an associated score in the score database, and upon determining that the information source has an associated score in the score database, retrieving the score and returning to the extracting step.

According to another aspect of this embodiment, the method further includes identifying an event from each source in a set of information sources; calculating an event score for the content item describing the event based on a credibility score for each of the known sources in the set of information sources; and combining the score for a respective information source with the credibility score to determine a cumulative event score.

According to another aspect of this embodiment, each of the sources in the set of information sources is classified as one of a known good source, a known bad source and an unknown reliability source, and wherein the calculating an event score is biased towards sources identified as known good sources.

According to another aspect of this embodiment, the event score is calculated as:

$$EventScore = \begin{cases} A & \text{if event contains a } Kg, \\ \dfrac{A}{m} & \text{if event contains } b \text{ unknown and no } KG \text{ nor } KB \\ \dfrac{A}{n} & \text{if event has less than } b \text{ unknowns and no } KG \text{ nor } KB \\ \dfrac{A}{p} & \text{if event has no } KG \text{ and includes a } KB \end{cases}$$

where A, m, n and p are parameters selected such that A/p<A/n<A/m<A; KG is a known good source; KB is a known bad source.

According to another aspect of this embodiment, the identified events are compared to identify contradictions, and the calculating an event score includes biasing events from known good sources to resolve the contradictions.

According to another aspect of this embodiment, the combining comprises calculating an event ranking representative of the event being reliable.

According to another aspect of this embodiment, calculating the event ranking is calculated as:

EventRank=$a$*EventScore+$b$*ΣLinkScore+ $c$*LinksToEvent where a, b and c are weighted coefficients and LinksToEven is calculated as:

LinksToEvent=$\Sigma_{i=1}^{n}$LinkScore($i$)×Sent where n is the number of sources and LinkScore is the score of the information source, and Sent is the sentiment score.

According to another aspect of this embodiment, the method further includes calculating an accumulated event rank for the information provider from a plurality of event ranks by:

$$AccumulatedEventRank = \frac{1}{N_i} \sum_{j=1}^{N_i} EventRank(j)$$

where EventRank(j) is a plurality of event scores for a plurality of content items and $N_i$ is a total number of content items of the information provider in the known source database.

According to a second embodiment of the invention, there is provided a computer-implemented method for ranking information stored on a computer readable medium; the method including identifying an event from each source in a set of information sources; calculating an event score for a content item describing the event based on a credibility score for each of the known sources in the set of information sources; and combining a score for a respective information source with the credibility score to determine a cumulative event score.

According to one aspect of this second embodiment, each of the sources in the set of information sources is classified as one of a known good source, a known bad source and an unknown reliability source, and wherein the calculating an event score is biased towards sources identified as known good sources.

According to another aspect of this second embodiment, the event score is calculated as:

$$EventScore = \begin{cases} A & \text{if event contains a } Kg, \\ \dfrac{A}{m} & \text{if event contains } b \text{ unknown and no } KG \text{ nor } KB \\ \dfrac{A}{n} & \text{if event has less than } b \text{ unknowns and no } KG \text{ nor } KB \\ \dfrac{A}{p} & \text{if event has no } KG \text{ and includes a } KB \end{cases}$$

where A, m, n and p are parameters selected such that A/p<A/n<A/m<A; KG is a known good source; KB is a known bad source.

According to another aspect of this second embodiment, the identified events are compared to identify contradictions, and the calculating an event score includes biasing events from known good sources to resolve the contradictions.

According to another aspect of this second embodiment, the combining comprises calculating an event ranking representative of the event being reliable.

According to another aspect of this second embodiment, wherein calculating the event ranking is calculated as:

EventRank=$a$*EventScore+$b$*ΣLinkScore+ $c$*LinksToEvent where a, b and c are weighted coefficients and LinksToEven is calculated as:

LinksToEvent=$\Sigma_{i=1}^{n}$LinkScore($i$)×Sent where n is the number of sources and LinkScore is the score of the information source, and Sent is the sentiment score.

According to another aspect of this second embodiment, the method further includes comprising calculating an accumulated event rank for the information provider from a plurality of event ranks by:

$$AccumulatedEventRank = \frac{1}{N_i} \sum_{j=1}^{N_i} EventRank(j)$$

where EventRank(j) is a plurality of event scores for a plurality of content items and $N_i$ is a total number of content items of the information provider in the known source database.

According to another aspect of this second embodiment, the score for a respective information source is determined by: extracting a content item describing an event from an information source; parsing by a parsing module the content item for a plurality of source links; attributing by a content analysis module a sentiment score to each source link; wherein the sentiment score is indicative of the relative credibility of each of the source links; scoring by a scoring module the information source based on the source links and on the sentiment score; and ranking the content item based on a score associated with the information source.

According to another aspect of this second embodiment, the scoring comprises
calculating r from:

$r=\alpha*T+(1-\alpha)*d$ where d is a non-zero static score distribution vector, T is a transition matrix, and α is a predetermined constant; and, wherein each term in the transition matrix is modified by a non-zero sentiment score.

According to another aspect of this second embodiment, the method further includes storing on a score database implemented on a computer readable medium the score for the information source.

According to another aspect of this second embodiment, the method further includes prior to the parsing step determining whether the information source has an associated score in the score database, and upon determining that the information source has an associated score in the score database, retrieving the score and returning to the extracting step.

According to another aspect of this second embodiment, the sentiment score is derived using a sentiment scorer that was created at least in part using:

a training set of known true and known false events; and known links and the associated text of the known links to content that specifies the known true and known false events.

According to another aspect of this second embodiment, the ranking score is used for any one or more of insurance underwriting, assessing suspected fraudulent activity, credit decisioning, securities trading, insurance underwriting.

According to other aspects of the invention, non-transitory computer readable media include computer executable instructions for carrying out the methods as herein described. In still other embodiments, computer systems for implementing the methods of the above-described embodiments are disclosed.

BRIEF DESCRIPTION OF THE DRAWINGS

An embodiment will now be described, by way of example only, with reference to the attached Figures, wherein.

DETAILED DESCRIPTION OF THE EMBODIMENT

As mentioned earlier, the present invention assesses the underlying credibility of sources and the probability that information from underlying sources, such as an event or a purported fact has occurred, is truthful or reliable. Events or facts may be derived from more than one source, and it is the events or facts themselves that are assessed for their reliability, rather than the web pages themselves. For the purposes of this description, the term "event" is used to describe a piece of information that is being subjected to the credibility assessment. An event as used herein may be any piece of information or purported fact, generally determined to be of significance to a request for information, such as a web-search. The term event is being used, in part because by definition the invention in its preferred embodiment is used to assess the reliability of a reported event having occurred, or facts identified as being relevant to a reported event. The invention does not, per se, relate to determining whether known facts are applicable to a user's query, for example, whether a particular scientific formula is relevant to solving a problem posed by a user's query.

Furthermore, the preferred embodiments are described with respect to online news source, but the sources of information for assessing the credibility of a reported event are not limited to these. Other sources may equally be used as inputs to the invention for the credibility analysis, including but not limited to RSS feeds, discussion forums, social media, such as Facebook™ or Twitter™, posts, emails, electronic journals, databases and/or web pages from a multitude of other sources. It may also be applied to information available on local networks that are not generally available to the public. In this manner, where the invention is being used by an institution for diligence purposes, such as fraud, insurance or personnel research, source of information belonging to or accessible only by the institution can also be included in the search universe to generate a higher degree of confidence in the results.

Figure 1:
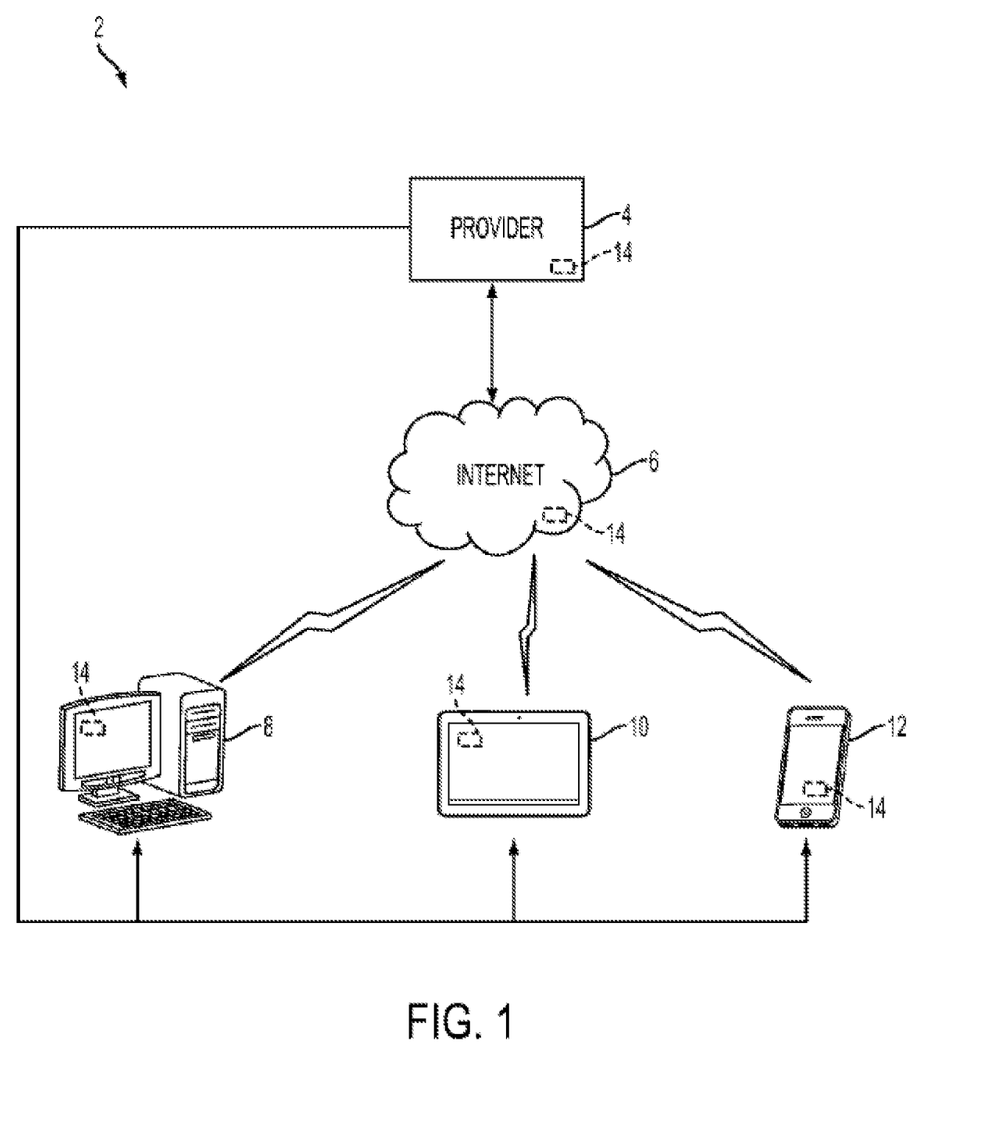
FIG. 1 shows a high-level architecture of a system for acquiring content items and applying scoring and ranking to the content.

FIG. 1 shows a network of computer systems 2 having an information provider 4 that provides information content via the Internet 6. Client devices such as a desktop computer 8, a tablet computer 10, or a mobile smartphone 12 request the information content using a hypertext transfer protocol (HTTP) that are transmitted over a wired or wireless link to the Internet 6 to the server systems of the information provider 4. The information provider in turn supplies the requested article to the client device. The computing structure 14 can reside on the client device, a proxy server(s), or other trusted computer system(s) on the Internet 6 or a combination thereof.

Figure 2:
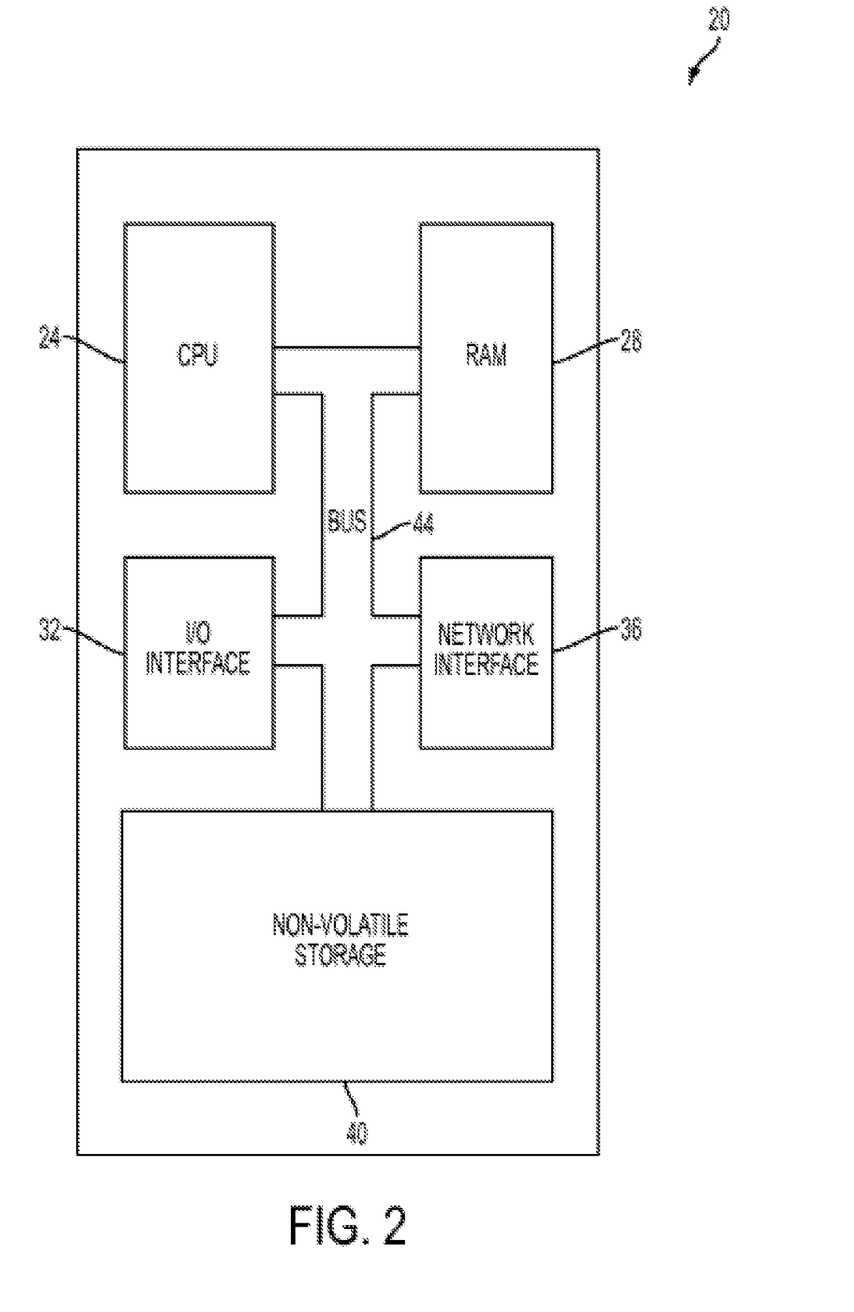
FIG. 2 shows a schematic of a computer system that may be used to implement various parts of the invention.

FIG. 2 shows a computer system 2, and includes a number of physical and logical components, including a central processing unit ("CPU") 24, random access memory ("RAM") 28, an input/output ("I/O") interface 32, a network interface 36, non-volatile storage 4, a display 40 and a local bus 44 enabling the CPU 24 to communicate with the other components. The CPU 24 executes an operating system, and a number of software systems and/or software modules. RAM 28 provides relatively-responsive volatile storage to the CPU 24. The I/O interface 32 allows for human-computer input to be received from one or more devices, such as a keyboard, a mouse, touch screen etc., and outputs information to output devices, such as a display and/or speakers. The network interface 36 (e.g. Ethernet, WiFi, Bluetooth, etc) permits communication with elements in network communication, and provides access to the internet. A number of these computer systems may be networked together, host information from other sources, etc. Non-volatile storage 4 stores the operating system and programs. During operation of the computer system, the operating system, the programs and the data may be retrieved from the non-volatile storage 4 and placed in RAM 28 to facilitate execution. These computer systems are known in the art, and their communications with the internet and other networks are also known. It is within this infrastructure that the preferred embodiments of the invention operate.

Broadly, the invention provides for two complementary approaches for generating a rank or score, although it is worth noting that each of the approaches could also be used independently to arrive at partial or intermediate results that are also useful. First, a method is described that assesses the reliability of the source of information, particularly the reliability of links. Next, a method is described that assesses the reliability of the content of the information regarding the event itself. A method of combining these approaches completes the preferred embodiment provides for a two-pronged approach to assessing the reliability of derived information.

Assessing the Reliability of Sources

Figure 3:
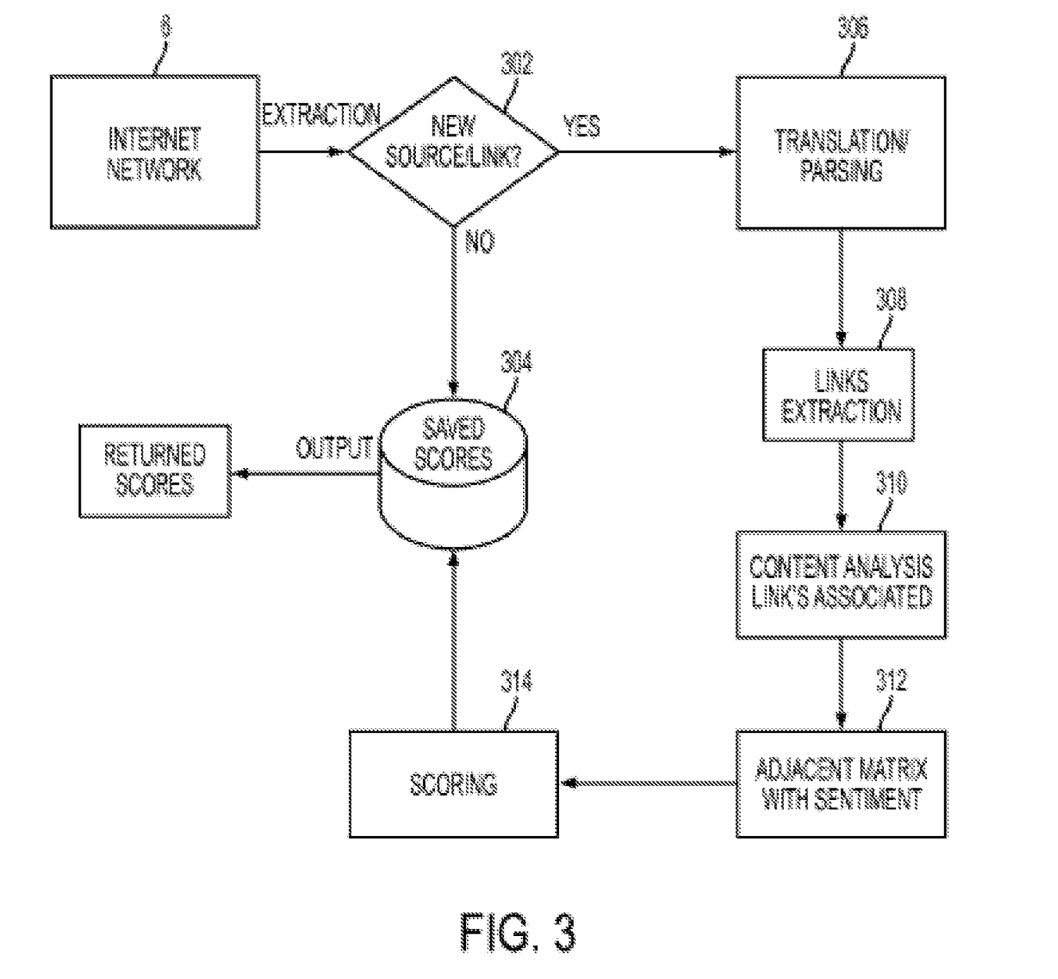
FIG. 3 shows a flow diagram of the method of scoring links associated with the content item.

Turning now to FIG. 3, there is illustrated a method for ranking or scoring links obtained from a source of information, such as a webpage. While prior art methods for assessing the quality of web pages by virtue of the links on those web pages do exist, the present invention provides this functionality in a more robust manner as will shortly be described. Prior art processes and algorithms use a random or biased web crawler to evaluate the rank of a page. After a certain number of iterations, the random crawler will locate the pages with a higher rank with a higher probability of being relevant. This approach includes the assumption that at a given web page the crawler randomly selects the links located at the web page, or select pages related to given subjects in a biased manner. This assumption is to some extent contrived since a real crawler will not act randomly when selecting links to follow but will select links based mainly on information accompanying the link. Some prior art web crawlers will mainly follow positive links and discard the negative ones. For example, if a link to a page said "this content is wrong" and another link said "here is the right answer", the positive link would receive a positive bias. One implementation of this includes assigning a probability factor (score) associated with the sentiment related to a link, a (0-1) value which would map from (negative sentiment-positive sentiment). The map could be done from a discrete sentiment score base for example with 3 levels, (positive, negative, no sentiment) or it can be done from a continue sentiment score base assigning sentiment scores to terms. A similar method was applied for Blog Distillation, the reference is "Blog Distillation via Sentiment-Sensitive Link Analysis, Giacomo Berardi et al. Natural Language Processing and Information Systems, Lecture Notes in Computer Science Volume 7337, 2012, pp 228-233

The preferred embodiment of the present invention includes a crawler that considers the sentiment (more specifically, the trust or credibility) relating to the link source to influence the crawling decisions. A probability function is determined that assigns different probability values to the links in the content item (typically a web page) according to the sentiments attached to the link sources.

For the purposes of this disclosure, a sentiment or sentiment score or sentiment ranking refers to the relative trust or credibility of links or references found at an information source in respect of an event. To illustrate this in simplest terms, the links on a particular source of information can be manually reviewed and identified as having a net "positive" or a net "negative" sentiment. Of course, the sentiment does not have to be a binary indicator, and it is preferable to have a plurality of degrees of sentiment. One method of establishing sentiment is described below. Alternate methods of determining sentiment are also contemplated, including algorithms, references to databases of known sentiment levels, etc.

As shown in FIG. 3, a content item in respect of an event or other piece of information is retrieved from the information provider via a source on the internet 6. Optionally, a determination is made at 302 whether the source of the retrieved content item has been previously scored. If the source has been previously scored, the sentiment score is retrieved from the saved score database 304. If the source of the content item has not been previously scored, a parsing engine 306 parses within the content item for links to other sources (e.g. source links). Each of the source links found are extracted by an extraction module 308, optionally along with the associated information of the source link such as the sentence in which the source link is found, the link descriptor, etc. The associated source itself or the information contained therein may then be analyzed by a content analysis module 310 to determine the sentiment or credibility associated with the source link.

In one embodiment, link sentiment can be composed as both a component of the source and the fundamental text around and included in the link to the content being analyzed. In one embodiment, the sentiment can be learned in an iterative semi-supervised or unsupervised approach post-seeding. In such an approach, a "dictionary" of known events or facts can be used to train the sentiment analysis scorer. As an example, consider the event "the Toronto Maple Leafs won the Stanley Cup in 1967" as a true event. The training process may include:

A. Create a dictionary of "trusted events" known to have occurred.
B. For each trusted event:
   B1. Determine known content that specify this event.
   B2. Find sources that link to that content.
   B3. Extract the text from the source that corresponds to the link.
C. Build a corpus of "trusted texts" representing the links to trusted events
D. Repeat B-C against controversial or untrue events to build a corpus of "untrusted texts" representing the links to untrusted events.
E. Build a text classifier or scorer based on similarity measures or other approaches to determine the link sentiment of unknown texts.

For a given event, the link sentiment information is then used to build a sentiment-adjusted matrix via module 312 which includes the sentiments related to the link connections. The scoring calculation engine 314 uses the adjacent matrix to iteratively compute the sentiment scores of each of the source links in the content item. The sentiment scores are then saved in the score database 304 which can be further accessed for fast score returns during future content item evaluations as described above.

While the general method described above, is thought to be novel, additional details of implementation will now be described, which enable certain method steps in a manner that would not be apparent to one skilled in the art. These details of implementation described in detail are considered non-obvious contributions to the art.

In particular embodiments, an algorithm is provided to score or rank (the sources based on their link connections using equation (1):

$$r = \alpha * T + (1-\alpha) * d \qquad (1)$$

where r is the score, d is a static score distribution vector with a given non zero entry and T is the transition matrix. α represents a decay factor, which is a constant that adjusts for the reliability of information, as represented by the probability that the crawler will follow an outlink from a given page. The decay constant is usually in the range 0.8-0.9 and it represents the probability that the crawler will follow an outlink from a given page. This rank estimation is similar to the TrustRank algorithm where linear dependencies on the number of in-links and out-links are considered. The rank is evaluated iteratively assuring convergence conditions are fulfilled. Generation the transition matrix is generally known from the TrustRank approach, and from other sources and is not described in further detail herein.

Of particular pertinence to this preferred embodiment is that the sentiment score of each of the source links is used to adjust the values of the links in the transition matrix, giving different probabilities depending on the sentiment score for different links. At a given node in the transition matrix, the probabilities for the transitions (e.g. link clicks) must be evaluated depending on the number of nodes and sentiments. If the node has A positive links, B negative links and C sentiment-unknown links, then it is possible to calculate this probability as: n $$Ax_+ + Bx_- + Cx_{nons} = 1 \qquad (2)$$

where $x_+$, $x_-$, $x_{nons}$ are the probabilities for a positive, negative and non-sentiment links. In general, it is assumed that the positive link will be clicked with higher probability than the non-sentiment and that the negative link will have the smallest probability, for example:

$$x_- = \frac{x_+}{n} \quad x_{nons} = \frac{x_+}{m} \qquad (3)$$

where m and n are parameters that can be varied with the only condition that n>m. The sum of the probabilities must be normalized to 1.

For example, in an extreme case a positive sentiment transition matrix can be constructed by removing all source links with negative sentiment. Similarly, a negative sentiment transition matrix can be constructed by removing all links with positive sentiment. From the positive transition matrix one obtains the higher rank for the highest trusted sources. In the case of the negative matrix the highest ranks will be obtained for the least trusted sources. These two ranks or scores can then be merged in a normalized way to obtain a final score. One simple approach is to divide every value by the maximum score in each case (positive and negative). In the case of the non-sentiment links, they can be treated together with the positive links giving smaller probabilities for these events in the transition matrix.

It will be understood that all approaches described herein are implemented on computer readable media and executed by a computer system as described earlier.

Assessing the Trustworthiness of Events

Figure 4:
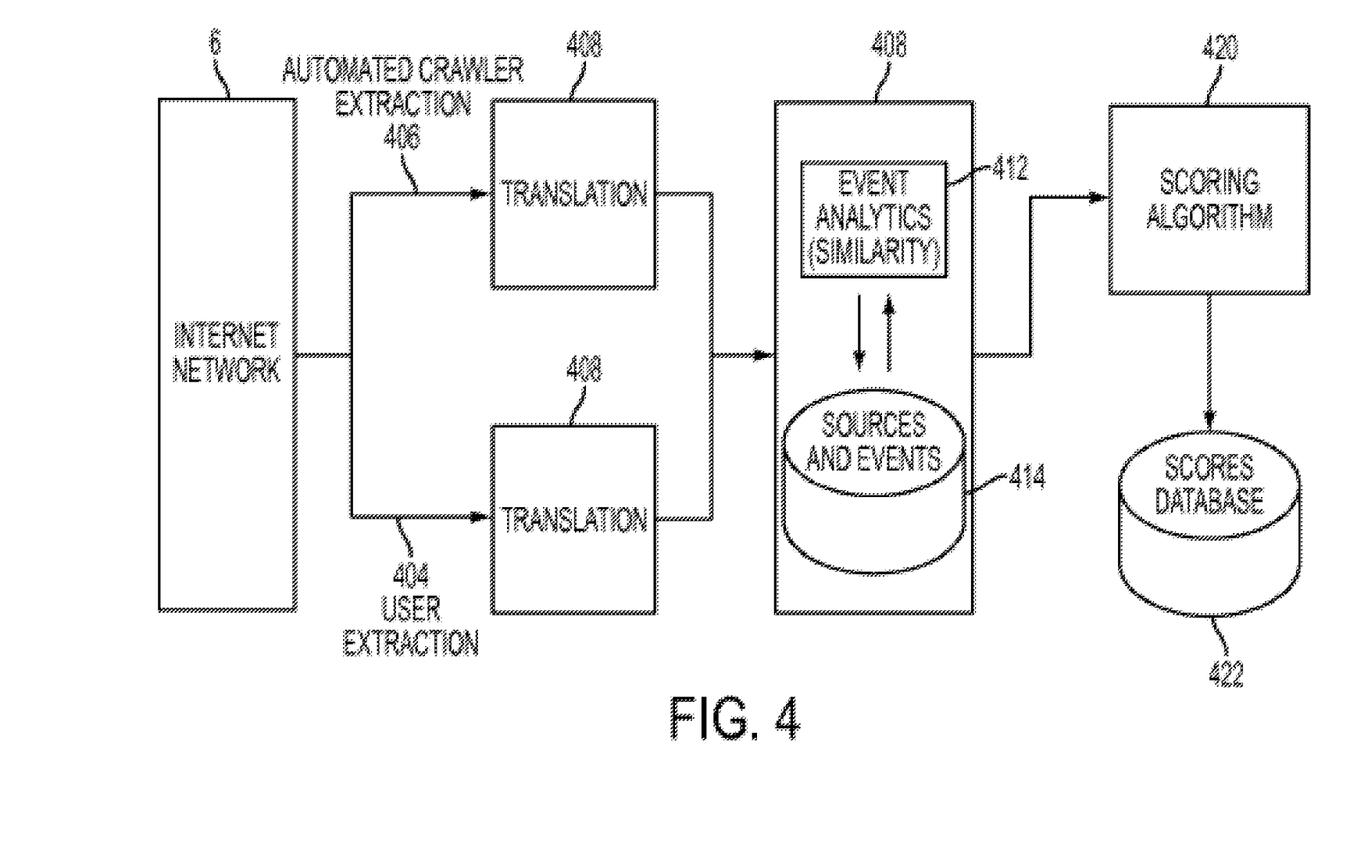
FIG. 4 shows a flow diagram of the method of the event analyzer where the event classification and scoring is performed.

Turning now to FIG. 4, the event-based engine generally assumes that a source of a content item describing an event has a credibility score based on other known sources describing the same or similar event. For example, a trusted source will share more information on an event with a known good (KG) source and less information with a known bad (KB) source. A content item is retrieved from the Internet 6. The request for the content item can be done manually by direct user request 404 or by an automated crawler 406.

The information is translated via a translation engine 408 into a form readable by event analyzer 410. Event analyzer 410 is a software implemented module that carries out a classification based on the similarity to other events stored within a defined time window. The event analyzer 410 retrieves the translated content item from the translation engine and passes it through a natural language processing algorithm (NLP) 412 to identify the events present within the content item to create a set of identified events. The NLP 412 algorithms are based on similarity measures plus keyword search and can have machine learning components known to those of skill in the art. In one approach, regular expressions (regex) or other pattern based approaches are used to identify set events as represented by set patterns of text. For example, "Acme Co. was acquired by Bob's company", could be represented by a rule that extracts based on the pattern that looks for text containing "was acquired by". More sophisticated examples, such as parser-based extraction, knowledge-based extraction, etc are described by Hogenboom et al (http://iswc2011.semanticweb.org/fileadmin/iswc/Papers/Workshops/DeRiVE/derive2011_submission_1.pdf). The identified events and associated information provider may be stored in an events 414 database for further use.

A calendar may provide temporal information such as time and date to the event analyzer 410 in order to reduce noise levels when comparing events. The event analyzer 410 then performs a time-limited query of the events database 414 to identify candidate events for comparison to the identified events from the content item. An analyses of the candidate events with respect to the identified events from the content item is carried out to evaluate the candidate events with respect to the identified events in the content item and determines if any of the candidate events are contradictory to each other The candidate events and associated sources as well as the identified events from the content item are then evaluated by an event scoring module 420. The event scoring module 420 optionally first performs a query of a scores database 422 for each of the candidate events in order to determine if the source of information is a Known Good (KG), a Known Bad (KB), or an unknown source in terms of credibility and trust. The event score (or rank) for the content item is then determined according to the distribution between KG and KB sources by the following formula:

$$EventScore = \begin{cases} A & \text{if event contains a } Kg, \\ \dfrac{A}{m} & \text{if event contains } b \text{ unknown and no } KG \text{ nor } KB \\ \dfrac{A}{n} & \text{if event has less than } b \text{ unknowns and no } KG \text{ nor } KB \\ \dfrac{A}{p} & \text{if event has no } KG \text{ and includes a } KB \end{cases}$$

where an event contained in at least one KG source will have an event score A for the corresponding news source. An event with no KG or KB included but with b unknown included is scored as A/m. In the case of an event with no KG or KB involved and a number of unknowns less than a set value b then the score will be A/n. An event with no KG and with a KB involved KG will result in the score A/p, where A could be any natural number for example A=10 and m, n, p are also parameters which can be adjusted for better score discrimination provided that m<n<p and A/p<A/n<A/m<A. Particular values for each of these parameters can be optimized depending on the context in which the invention is used. Once a score has been generated for the content item, it can be stored so that future content requests drawing from the same source can make reference to a stored score rather than being processed again.

As noted above, identifying contradictory information to an event or other data that throws into dispute the trustworthiness of an event. This contradictory information is referred to herein alternatively as an anti-event, when the content item contradicts another known source. These anti-events can be scored in as: A/A1 if the event contradicts a KB and A/p1 when the event contradicts a KG where A1 and p1 are parameters as well which need are predetermined, and selected depending on the context in which the invention is used. Generally, $A1 \lessapprox 1$ and $p1 \lessapprox p$.

Preferably, a suitable corpus from a known set of seed sources must be present in the events database 410. This seed set of sources comprises KG and KB sources that can be progressively adjusted and enriched when more content items (and their sources) are analyzed. The seed set can be manually generated or could rely on other approaches based on spam or trust detection. For example, the New York Times™ may receive a high trust score from an anti-spam algorithm and thus would fall into the KG classification in the database. In one embodiment, an input seed source can initially include a list of relevant sources and a result of the highest ranked sources of the link-based algorithm of the present embodiment.

An information provider or source can gain a KG status if a sufficient number of content items and events is consistently shared with other previously KG sources within the database. Similarly, an information provider can gain a KB status if a sufficient number of content items and events is consistently shared with other previously KB sources. Sources with content items and events sharing both KG and KB sources or only untrusted sources will continue to be labeled as an untrusted source.

Alternatively, content items and events with no corresponding KG or KB sources can be scored according to the number of sources agreeing or disagreeing with the risk of adding additional noise to the scoring process. If the noise is too great, these content items can be omitted when ranking. Another approach could be to use the previous link-based score, which gives already an independent score base characterizing the sources and have some insights on the distribution and apply a corresponding score. For example, imagine we have the case of 5 news sources we want to characterize and 4 of them are untrusted sources (without KG or KB included) there will be one source that will contradict the other 4. If we know that the sources' distribution is dominated or most likely be dominated by un-trusted sources we can score the source that contradicts more times like a signature of trust and opposite in the case of a distribution dominated by trusted-sources.

Cumulative Scoring

The event ranking module contains the EventScore, the LinkScore associated with the sources within the content item and a 3rd term related to links and sentiment attached to the event itself as it will be further described.

$$EventRank = a*EventScore + b/t*\sum_{i=1}^{t} LinkScore(i) + c*LinksToEvent$$

where the a, b and c coefficients are weights, the second term takes into account the LinkScores of the sources which reproduced the event (t is the number of sources), and LinksToEvent will map all links. In this case we want to differentiate links directing to a webpage and links directing to a given event. From our adjacent matrix we know the links directing to a webpage, so we can select the ones directing only to the event we are analyzing and sum over their LinkScores (for each source with a link directing to the event) to the given event together with the sentiment analysis attached to the link. This factor can be estimated as:

$$LinksToEvent = \sum_{i=1}^{n} LinkScore(i) \times Sent$$

where n is the number of links directing to the content that contains the given event. LinkScore is the score of the source of the link directing to the event and Sent is a factor which considers the sentiment attached to the link.

The integrated AccumulatedEventRank will be evaluated in both cases as:

$$AccumulatedEventRank = \frac{1}{N_i} \sum_{j=1}^{N_i} EventRank(j)$$

where the individual scores are added for an information provider and a normalization is done to the total number of events of the respective information provider Ni.

In practice, the content of a source could be rather unique. For example, if one looks at a local newspaper and compares with what is being published in a national or international newspaper, just because they cover different objects, geographies or they have different interests, there will likely be very little overlap in events. This does not mean a source is un-trusted, and these cases will be complemented by the LinkScore algorithm.

A final source score will be obtained after normalization of both LinkScore and AccumulatedEventRank. The final source score can be calculated in first approach as the weighted average value of both scores which we call SourceRank as:

$$SourceRank = weightLink*LinkScore + weightEvent*AccumulatedEventRank$$

where weightLink and weightEvent are weighting factors which are estimated using a test database with result cases, and can be optimized by one skilled in the art based on the data set being used.

Note that both the event scoring and source scoring approaches allow for detection and handling of badly extracted data. An important consideration is that event detection, even, with state-of-the-art systems, can be error-prone. In such cases, the extracted information may not be accurate compared to the source. One advantage to the invention, as described, is that an incorrectly extracted event can be discriminated against via a low event trust score, removing noise from the event extraction process. If a particular source is extracted in a particularly noisy fashion, perhaps because of the way the source is structured, then this is reflected in the SourceRank.

Example

Figure 5:
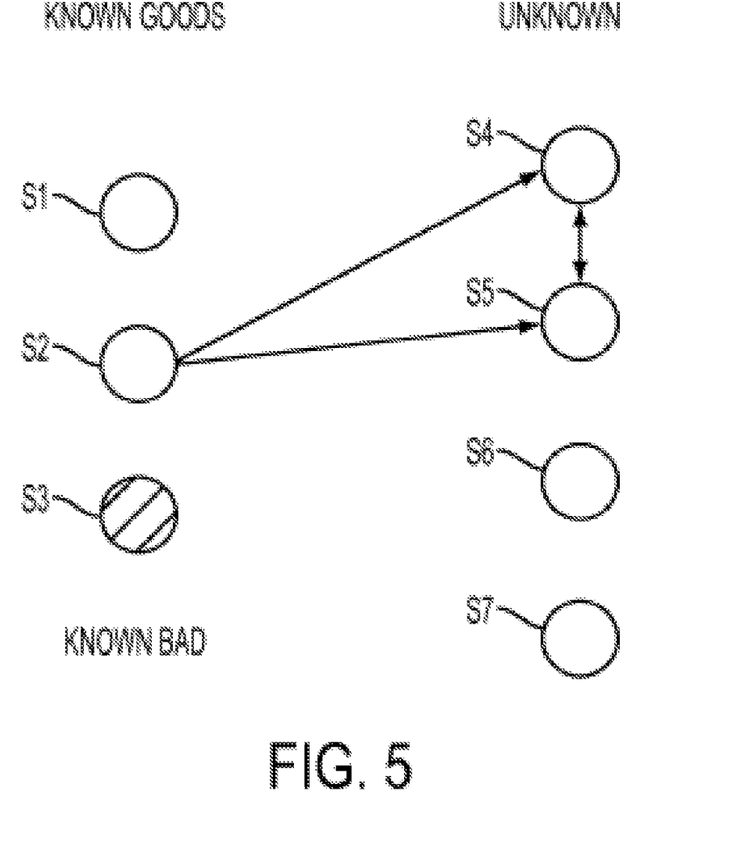
FIG. 5 shows an example of event classification and scoring.

As an example Figure shows 8 sources with hypothetical link connections and a discrete 3 level sentiment score associated with it. The original transition matrix would look like:

$$T = \begin{pmatrix} 0 & 0 & 0 & 0 & 0 & 0 & 0 & 0 \\ 1 & 0 & 1 & 0 & 0 & 0 & 0 & 0 \\ 0 & 1/2 & 0 & 0 & 0 & 1 & 0 & 0 \\ 0 & 1/2 & 0 & 0 & 0 & 0 & 0 & 0 \\ 0 & 0 & 0 & 1 & 0 & 0 & 0 & 0 \\ 0 & 0 & 0 & 0 & 1/3 & 0 & 0 & 1 \\ 0 & 0 & 0 & 0 & 1/3 & 0 & 0 & 0 \\ 0 & 0 & 0 & 0 & 1/3 & 0 & 0 & 0 \end{pmatrix}$$

If we consider the sentiments attached to the links we can generate a new transition matrix as for example:

$$T = \begin{pmatrix} 0 & 0 & 0 & 0 & 0 & 0 & 0 & 0 \\ 1 & 0 & 1 & 0 & 0 & 0 & 0 & 0 \\ 0 & 1/3 & 0 & 0 & 0 & 1 & 0 & 0 \\ 0 & 2/3 & 0 & 0 & 0 & 0 & 0 & 0 \\ 0 & 0 & 0 & 1 & 0 & 0 & 0 & 0 \\ 0 & 0 & 0 & 0 & 0.6 & 0 & 0 & 1 \\ 0 & 0 & 0 & 0 & 0.3 & 0 & 0 & 0 \\ 0 & 0 & 0 & 0 & 0.1 & 0 & 0 & 0 \end{pmatrix}$$

Where we selected some probability values for the links according to the sentiments attached. The real probability distribution might be different from what we showed in this example. We can create a positive and a negative transition matrix in the same way, by taking only positive and negative sentiment links.

In the Figure we specified that source 2 and 4 are trusted ones, so we can set the vector d as:

$d = [0, \frac{1}{2}, 0, \frac{1}{2}, 0, 0, 0, 0]$

In the last example we only took into account link connections between sources as a whole, for the EventRank we need to include also links directing to a given event.

As an example, in FIG. 5, consider seven sources (labeled S1-S7): 4 unknown which are to be evaluated for the EventRank value, 2 KG sources and 1 KB source which were previously analyzed and are now used as seeds. Suppose an event (news) that appears in the unknown sources 4, 5 and in the KG source 2. The EventScore is evaluated and in parallel the link-based analysis is conducted to determine the LinkScores associated with the event.

If we continue running many events then we are going to have accumulation data for the AccumulatedEventRank and the final SourceRank. Best and worse values for the SourceRank will provide feedback in the seed of KG and KB sources, and improving the EventRank estimation gradually. Convergence conditions need to be settle providing that optimum EventRank and SourceRank results are obtained.

Neural networks, cluster models, hidden Markov models, Bayesian networks, or other machine learning methods can also be used to classify or create clusters for further analysis, potentially optimizing the best-fitting algorithms, performing the calculations on a subset of documents or acting as a replacement or first-pass against large sets of documents. Alternatively creating decision tress or other path optimization approaches can be used.

The above-described embodiments may be useful in a number of contexts where the integrity of an event or fact may be critical to ascertain. Several examples of use are now described. However, these examples are not meant to be comprehensive. One example is for use in scoring and verifying information for an applicant for insurance underwriting. In such an example, it is important an applicant is not, for example, denied insurance based on incorrect information.

In another example, the methods described may be useful in assessing possible fraudulent activity. Automated monitoring systems may generate many alerts based on detected "events" that may not be verified. The methods, as described, can be used to score events to determine their validity. Alternatively, abnormal or unexpected events or facts could be flagged for further scrutiny.

In another example, the methods described may be employed to help with credit decisioning, either by an automated system or to support the decision of a loan officer. In such a scenario, assessing the truthfulness or validity of detected information can be an important part of determining what information impacts the credit decision.

In another example, the methods described may be used for securities trading, either as support for a human trader or as part of an automated system. Automated systems that trade on news or events detected are already used by traders. Adding the ability to measure the trustworthiness of detected events could be an important advantage for these systems, for example, by preventing trading decisions based on false or poor information.

The above-described embodiments are intended to be examples of the present invention and alterations and modifications may be effected thereto, by those of skill in the art, without departing from the scope of the invention, which is defined solely by the claims appended hereto.

What is claimed is:

1. A computer-implemented method for establishing a credibility assessment engine for assessing the credibility of internet-based information sources, wherein each information source is a provider of content, the method comprising:

obtaining, over the internet, a set of seed content items from one or more internet-based seed sources, each internet-based seed source of the one or more internet-based seed sources being either a known good (KG) source or known bad (KB) source, and a set of non-seed content items that are not seed content items from one or more internet-based information sources that are not seed sources;

generating, from the KG sources, a set of trusted events deemed to have occurred and, from the KB sources, a set of untrusted events deemed not to have occurred;

for each of the trusted events deemed to have occurred, determining a trusted subset representing a subset of seed content items from KG sources that contain the trusted event; determining which of the one or more internet-based information sources that are not seed sources link to the trusted subset; generating trusted extracted texts by extracting text from each of the one or more internet-based information sources that are not seed sources that links to the trusted subset; and building a trusted corpus comprising the trusted extracted texts;

for each of the untrusted events deemed not to have occurred, determining an untrusted subset representing a subset of seed content items from KB sources that contain the untrusted event; determining which of the one or more internet-based information sources that are not seed sources link to the untrusted subset;

generating untrusted extracted texts by extracting text from each of the one or more internet-based information sources that are not seed sources that link to the untrusted subset; and building an untrusted corpus comprising the untrusted extracted texts;

assigning, by a content analysis module comprising a processor, a link sentiment to each link of each non-seed content item in the set of non-seed content items, the link sentiment based on a similarity measure of text in the non-seed content item to the trusted corpus of trusted extracted texts and the untrusted corpus of untrusted extracted texts; storing each link sentiment together in a score database of the credibility assessment engine;

assessing the credibility of and generating a credibility score for each of the one or more internet-based information sources that are not seed sources by combining, by a scoring module comprising a processor, the link sentiments of non-seed content items obtained from each of the information sources that are not seed sources; and storing the credibility score of each of the one or more internet-based information sources that are not seed sources together in the score database.

2. The method of claim 1, further comprising ranking information obtained from a set of internet-based information sources by:

parsing each content item describing an event and within the set of internet-based information sources for a plurality of source links; attributing, by the content analysis module, a link sentiment score for each source link of said plurality of source links, wherein said link sentiment score is indicative of a relative credibility of each source link of the plurality of source links;

scoring, by the scoring module, each of the internet-based information sources in the set corresponding to each content item, based on said link sentiment score of each of source link of said plurality of source links to produce a credibility score for each of the internet-based information sources of the set and calculating an event score for each content item describing said event based on the credibility score for each respective internet-based information source of the set; and combining said event score for a content item of a respective information source of the set with said credibility score of the respective information source of the set to determine a cumulative event score.

3. The method of claim 2, further comprising prior to said parsing step determining whether an analyzed information source of the set has an associated credibility score in said score database, and upon determining that said analyzed information source has an associated credibility score in said score database, retrieving said credibility score.

4. The method of claim 2, wherein each information source of the set is classified as one of the KG source, the KB source and an unknown reliability source, and wherein said calculating an event score for each content item is biased towards sources in which an event is described that have been identified as known good sources.

5. The method of claim 2, wherein content items describing events in respective information sources of the set are compared to identify contradictions, and said calculating an event score for each content item includes biasing events from known good sources to resolve said contradictions.

6. The method of claim 2, wherein said combining comprises calculating an event ranking representative of an event described by a content item as being reliable.

7. The method of claim 2, wherein at least one of a cumulative event score and an event score obtained from the set of information sources is used to cause software tools to assess risk in insurance underwriting, suspected fraudulent activity, credit decisioning, securities trading, and insurance underwriting.

8. The method of claim 1, wherein an identification of each internet-based seed source of the one or more internet-based seed sources as a known good (KG) source or known bad (KB) source is based on a rating from a trusted third party source.

* * * * *